(12) United States Patent
Hayes (10) Patent No.: US 10,787,335 B2
(45) Date of Patent: Sep. 29, 2020

(54) REUSABLE HARVESTED BALE WRAPPING MATERIAL

(71) Applicant: L.P. BROWN COMPANY, INC., Memphis, TN (US)

(72) Inventor: James L. Hayes, Senatobia, MS (US)

(73) Assignee: L.P. BROWN COMPANY, INC., Memphis, TN (US)

( * ) Notice: Subject to any disclaimer, the term of this patent is extended or adjusted under 35 U.S.C. 154(b) by 0 days.

(21) Appl. No.: 16/503,974

(22) Filed: Jul. 5, 2019

(65) Prior Publication Data

US 2019/0322477 A1 Oct. 24, 2019

Related U.S. Application Data

(62) Division of application No. 15/717,277, filed on Sep. 27, 2017, now Pat. No. 10,384,899.

(Continued)

(51) Int. Cl.
*B65D 65/22* (2006.01)
*B65H 18/00* (2006.01)
*A01F 15/07* (2006.01)
*B65B 41/10* (2006.01)
*B65D 65/14* (2006.01)

(52) U.S. Cl.
CPC ........... *B65H 18/00* (2013.01); *A01F 15/071* (2013.01); *B65B 41/10* (2013.01); *B65D 65/14* (2013.01); *A01F 15/0715* (2013.01); *A01F 2015/0745* (2013.01); *B65H 2701/1944* (2013.01); *Y10T 428/18* (2015.01); *Y10T 428/19* (2015.01); *Y10T 428/24017* (2015.01)

(58) Field of Classification Search
CPC ................. Y10T 428/18; Y10T 428/19; Y10T 428/24017; A01F 2015/0745; B65D 65/22
See application file for complete search history.

(56) References Cited

U.S. PATENT DOCUMENTS 7,541,080 B2 6/2009 Mass et al.
8,071,196 B2 12/2011 Goering
(Continued)

FOREIGN PATENT DOCUMENTS

GB 2221841 A 2/1990

OTHER PUBLICATIONS

The United States Patent and Trademark Office; The International Search Report and Written Opinion of the International Searching Authority, or the Declaration; International Search Report and Written Opinion for PCT/US17/53718; dated Jan. 2, 2018; pp. 1-11; The United States Patent and Trademark Office; U.S.

*Primary Examiner* — Alexander S Thomas
(74) *Attorney, Agent, or Firm* — Wyatt, Tarrant & Combs, LLP; Stephen C. Hall; Max E. Bridges (57) ABSTRACT

The current disclosure involves the arrangement and efficient deployment of self-adhering flexible sheet material in individual segments to encircle a bale of harvested material and isolate it from the wind, precipitation, and other elements as it remains in the field following the formation of the bale attendant with harvesting of the crop, until collected for further processing. For use with harvested crops such as cotton or hay, the individual wrapping segments further comprise adhering members, which cause a portion of a wrapping segment, generally found at what is considered a trailing end during a wrapping cycle, to releasably attach to adhering members on an opposite surface of the same wrapping segment.

9 Claims, 4 Drawing Sheets

Related U.S. Application Data

(60) Provisional application No. 62/400,288, filed on Sep. 27, 2016.

(56) References Cited

U.S. PATENT DOCUMENTS

| | | |
|---|---|---|
| 2010/0239805 A1 | 9/2010 | Goering |
| 2011/0309544 A1 | 12/2011 | Hupp et al. |
| 2013/0221078 A1 | 8/2013 | Skelton |
| 2013/0312381 A1 | 11/2013 | Lang |
| 2014/0352263 A1 | 12/2014 | Harchol et al. |
| 2016/0280404 A1 | 9/2016 | Porter et al. |

REUSABLE HARVESTED BALE WRAPPING MATERIAL

CROSS-REFERENCE TO RELATED APPLICATION

The present application is filed under 35 U.S.C. § 120 claiming priority as a divisional patent application of U.S. Nonprovisional patent application Ser. No. 15/717,277, filed Sep. 27, 2017, now U.S. Pat. No. 10,384,899 which claims priority to U.S. Provisional Patent Application No. 62/400,288, filed on Sep. 27, 2016, the specifications of which are hereby incorporated in their entirety herein.

FIELD OF INVENTION

Harvesting of agricultural crops including hay and cotton is accomplished by a self-propelled machine that collects the crop and compresses it into successive bales. The current disclosure involves the arrangement and efficient deployment of self-adhering flexible sheet material in individual segments to hold a bale together and isolate it from the weather/rain and other elements in the field until the bales may be collected for further processing.

BACKGROUND

The present invention is directed to sheets of wrapping material that can be arranged on a roll around a central core, and used in an agricultural baler to securely wrap a harvested cylindrical bale. In the process of wrapping during the harvesting, the wrapping material must be securely bound to the bale to ensure protection against the elements in the field. Secondly, conventionally there has been a mechanism within the wrapping material to separate the active wrapping segment for the bale from the available wrapping material on a roll being used with an agricultural baler. Prior wrapping materials have included rolls of individual wrapping segments successively joined via elaborate Z-folds or laminates including multiple interacting adhesive layers to form an otherwise 'continuous roll' of segments, wherein the trailing end of each segment has an adhesive surface to seal the end of the wrap on the bale to the wrapping surface immediately beneath it. The intricacies of prior wrapping materials were meant to isolate the adhesive until the end of the process to prevent the adhesive from wrongly sticking to winding machinery in the winding cycle or to dispensing rollers and other wrapping machinery during the wrapping cycle, and the efficiencies were aimed (with mixed results) at providing all of this functionality on a continuous roll of material with separable wrapping segments releasably joined together.

But in spite of prior attempts, there is still a need for a practical and feasible reusable wrap covering for the harvested bales. Moreover, there is a significant desire for this capability, given the cost and waste associated with discarding the wrapping materials after a single use. Even though the plastic is relatively inexpensive, being limited to just one use cycle per segment adds significantly to the overall cost of producing harvested agricultural products such as cotton and hay. Accordingly, there is a well-defined need that would result in significant savings for a reusable wrapping material.

Against this basic backdrop, the current embodiments may be better understood with the following descriptions and explanations, particularly as the inventive wrap and method of utilization thereof accords significant benefits and savings in comparison to prior approaches. In this context, a wrapping material is provided herein for such as cylindrical bales of field crops (e.g., cotton and hay), wherein wrapping segments are identified by adhering members that comprise hook and loop fasteners for attaching one end of the wrapping segment to another end, thus securely encircling a cylindrical bale.

SUMMARY OF EMBODIMENTS

Generally, then, the embodiments herein encompass a plurality of successive wrapping segments with a first wrapping segment, a series of middle wrapping segments, and a last wrapping segment attached to a cylindrical core, said wrapping segments being provided together preferably but capable of single segment use, wherein each of said wrapping segments has a leading section, a trailing section, and a body section therebetween, wherein said wrapping segment leading section extends from a leading end to said body section. In such instances where the wrapping segments are arranged on a core, typically this would be a cardboard or plastic cylinder of a certain diameter in order to allow unwinding of the wrap material at desired rates and distances. Also included herein are embodiments directed to a roll of wrapping segments as described above, wherein two portions of a single wrapping segment are releasably joined by adhering members, such as, but not limited to reusable/reclosable fastening system of fabrics comprising either or both of hooks that stick to corresponding small loops on a corresponding piece of fabric when the two fabrics are joined together. Examples of such "hook and loop" products suitable for use with present embodiments include 3M™ Dual Lock™ as well as Velcro® fasteners.

As known to those having ordinary skill in the art, such hook and loop products which can be used as trailing end adhering members and body adhering members as described below will fall within a suitable range for strength needed to maintain a sustained hold to secure together respective ends of a wrapping segment until the wrapping material is ready to be removed, usually at a point after the harvested material has been removed from the field and transported to a facility for processing.

Likewise, such hook and loop products which can be used as leading end adhering members, in some embodiments working in tandem with trailing end adhering members of an adjacent wrapping segment for releasably holding two adjacent wrapping segments on a roll, will have sufficient strength to hold those segments as they are added to a roll. In this way, the leading end adhering members allow the adjacent wrapping segments to release when a speed differential induces the two wrapping segments to separate. The separation occurs so that the trailing end of one wrapping segment will wrap around a harvested material and be joined to the same segment's leading end, while the leading end of the adjacent wrapping feeds into the picking machinery for the next wrapping cycle.

Further included within this invention are methods of forming a wrapping material for wrapping at least one solid object (such as, without any limitation intended, an agricultural bale, like cotton) within a wrap application device (such as, again, without any limitation intended, a harvesting device) with at least one wrapping segment of the inventive wrapping material rolls described above is also encompassed within this invention.

In some embodiments, the material comprising the adhering members is overlaid on opposite surfaces of the wrapping material, with the adhering members being joined to the wrapping material by bonding, sewing, or welding (e.g., sonically welded or heat welded) or otherwise connected. The adhering members may be positioned on the wrapping material in any desired geometric shape. In some embodiments, the wrapping material is provided as individual segments.

In some embodiments, the wrapping material consists of a first surface and a second surface formed by a single ply thickness with adhering members on both surfaces. One of the surfaces of each wrapping segment, for ease of reference (but not by way of limitation) referred to herein as a first surface, is configured on a roll to be facing away from the bale as the wrapping segment is dispensed from a roll or otherwise brought into contact with a bale. In turn, the other surface of that same wrapping segment, for ease of reference (but not by way of limitation) referred to herein as a second surface, is configured to face the bale. In this manner, as the wrapping material encircles the bale along its entire cylindrical length, the first surface faces outward and away from the bale and is contacted by wind, precipitation, and other elements of the environment, and the second surface is in contact with the bale. Likewise, the first surface will have adhering members facing out, which receive adhering members of the opposite surface, which in some embodiments are positioned at what would be considered a trailing end of the wrapping segment. Upon the adhering members on both surfaces coming in contact and joining to each other, the wrapping segment is securely covered over and around the bale, albeit generally as is custom the end circles of the cylindrical bales may remain exposed.

Such wrapping materials are typically sturdy, manufactured materials including canvas and durable plastics. The embodiments disclosed herein are not limited to any exact type of material. Wrapping segments can be formed from single-ply or multi-ply substrates configured as sheets of material. Because the wrapping material is reusable, a stronger substrate may be desired compared with disposable wraps. Indeed, one advantage of the present embodiments is their cost effectiveness. While production of one such reusable wrapping segment is likely to cost more than for a disposable, owing to better and more expensive materials in part, the number of uses for each segment more than adequately makes up this cost difference.

Other features and improvements include the ability, through proper configuration designs, to achieve a plurality of wrapping segments comprising hook and loop adhering members on at least a first surface of the substrate. Moreover, in some previously available wrapping materials, a continuous web is formed with adjacent wrapping segments that can be separated from each other either at a point of weakness associated with perforations and the like. Another feature of the present embodiments is the ability to have multiple wrapping segments added to a core, wherein it is not necessary to separate the individual units as by scoring, dotting, perforations, punctures, and the like to form a point of weakness. Rather, each individual wrapping segment might be in contact with another, adjacent wrapping segment as part of an arrangement of multiple wrapping segments on a roll. However, the point of contact between any two adjacent wrapping segments contains hook and loop fasteners that are releasable without having to rip, tear, or separate any of the wrapping segment material itself. Accordingly, the benefits described herein are supplied for improved versatility and utility of the subject wrapping materials.

FIGURES

The drawings, schematics, figures, and descriptions contained herein are to be understood as illustrative of steps, structures, features and aspects of the present embodiments and do not limit the scope of the embodiments. The scope of the application is not limited to the precise arrangements or scales as shown in the figures.

Combined, FIGS. 1A and 1B provide a perspective view of a wrapping segment having adhering members, e.g., hook and loop fasteners, according to multiple embodiments and alternatives. FIG. 1A illustrates a first surface, and FIG. 1B illustrates a second surface of the same wrapping segment.

MULTIPLE EMBODIMENTS AND ALTERNATIVES

In some embodiments, the wrapping materials according to multiple embodiments herein are provided in an elongated sheet, or a plurality of sheets formed and placed upon a roll around a central core. Such a wrapping material, as described above, may be utilized for use in wrapping of solid objects, here, in particular, for the advantageous features described herein, as it relates to agricultural products, such as cotton, and may be composed of one or more of a variety of materials including, without limitation, polyolefin (e.g., polyethylene) films, polyolefin nettings, mesh, and woven or fibrous materials.

The width of such a wrapping material should be sufficient to cover the cylindrical length of the subject bale or other item being wrapped with a thickness sufficient to withstand the elements of nature if left in an agricultural field for a period of time surrounding a subject bale. In some embodiments, and in non-limiting fashion, the length of a suitable agricultural wrapping material substrate (i.e., wrapping segment 1) is from about 15 to about 25 meters, depending upon the harvested material. It is desirable for the length of such a wrapping segment to be sufficient to wrap all the way around a range of modules at least from 50 inches to 94 inches in diameter so that some portion proximal to a trailing end of a wrapping segment will overlap with some portion proximal to a leading end of the same wrapping segment. For example, in many cotton module forming machines, a 69-foot long wrapping segment generally is sufficient to accomplish this.

In some embodiments, each wrapping segment has a "chevron" shape with a tip pointed outward (away from the body of the wrapping segment) near the leading end. Conversely, the trailing end of the wrapping segment exhibits an inwardly pointed shape that is the inverse of the leading end. In other words, geometrically, the leading end would be considered a convex shape and the trailing end would be considered concave. The length and slope of the chevron portion shall have a fairly wide range of suitable angles, and the exact dimensions are non-limiting. Various aspects related to geometries and shapes, and other wrapping material features including in non-limiting fashion rigidifying additions and indicators such as without limitation bar codes and QR codes, and placement of wrapping materials around a core for use, among other features, are described in U.S. application Ser. No. 14/667,574, titled "WRAPPING MATERIALS FOR SOLID OBJECTS" filed Mar. 24, 2015, and published as US Publication No. 2016/0280404, the full contents of which are expressly incorporated herein by reference for all purposes.

Figure 1A:
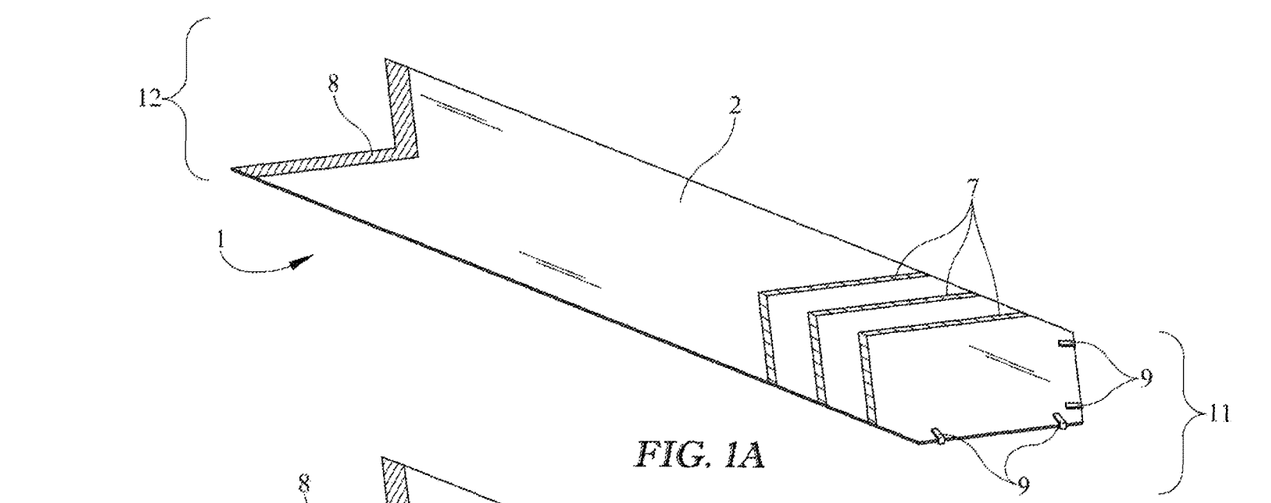

With reference now to the Figures, FIG. 1A shows a first surface 2 of wrapping segment 1 having leading end 11 and trailing end 12. Wrapping segment 1 is further illustrated with trailing end adhering members 8 positioned thereon at what would be considered proximal to its trailing end, i.e., the area of the wrapping segment that encounters the bale last during a wrapping operation. For brevity, these adhering members will be referenced herein and in the figures as adhering members 8. In some embodiments, first surface 2 will be the surface that faces the elements after the wrapping segment is placed around a bale.

FIG. 1A also illustrates body adhering members 7, and these are generally referred to as being positioned along a body region of wrapping segment 1, because this region is not directly located at either of the leading or trailing ends of a wrapping segment, but rather adhering members 7 generally are positioned between the two ends, and the two sides of the wrapping segment extend from end to the other. For brevity, these adhering members will be referenced herein and in the figures as adhering members 7. Thus, it will be typical for adhering members 7, 8 to be located at different positions along the length of the wrapping segment on their respective surfaces.

Figure 1B:
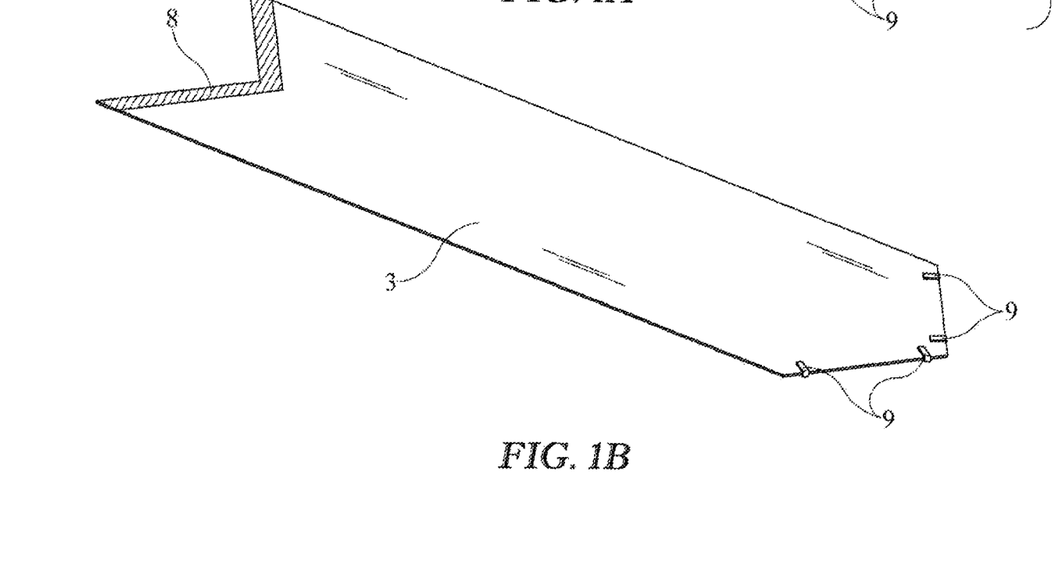

In some embodiments, adhering members 8, at the trailing end, are involved with holding adjacent wrapping segments together while positioned on a roll with a core. This would occur by positioning leading end adhering members 9 at the leading end of a wrapping section as shown in FIGS. 1A and 1B, which as previously mentioned is the portion of wrapping segment 1 having a "chevron" shape with a tip pointed outward utilized forward near the leading end. For brevity, these adhering members will be referenced herein and in the figures as adhering members 9.

Figure 4:
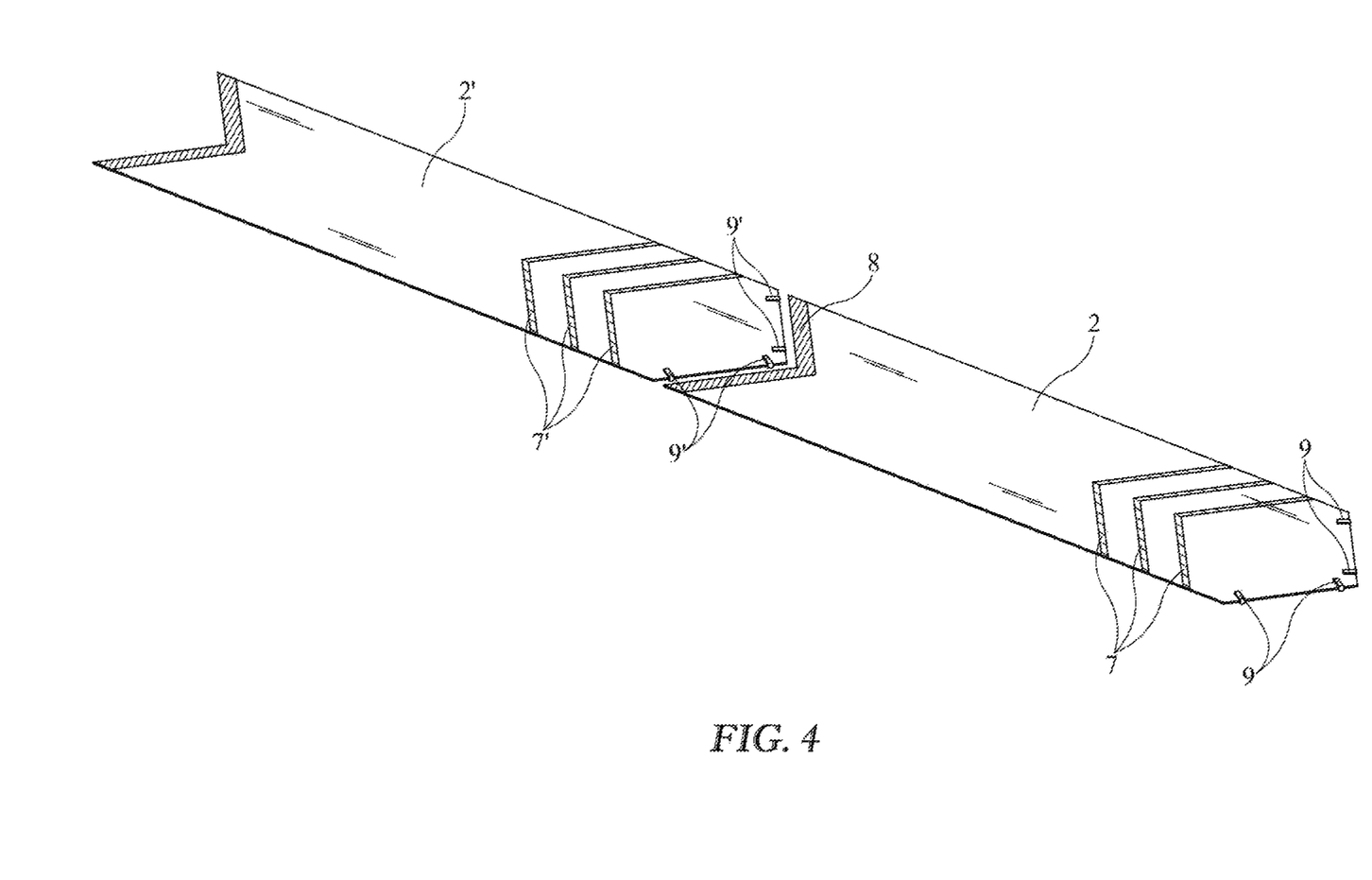
FIG. 4 is a perspective view of adjacent wrapping segments that are releasably joined as when multiple wrapping segments such as shown in FIGS. 1A and 1B are fitted onto a roll, according to multiple embodiments and alternatives.

In this way, the manufacture of multiple wrapping segments which are then arranged on a roll may involve adding some additional adhering members 9 at or proximal to the leading end of each wrapping segment 1, which are for tabbing and releasably attaching to adhering members 8 at a trailing end of an adjacent wrapping segment. The attachment is for releasably holding adjacent wrapping segments together in a temporary physical relationship, as when placed on a roll. In FIG. 4, two wrapping segments are shown in relationship to one another with adhering members 9 positioned to be engaged with adhering members 8. As mentioned herein, the embodiments are not limited to shape, dimension, or positioning of adhering members 9. FIG. 1A and FIG. 1B both show adhering members 9 attached on surface 2 but also extending around the forward leading end where they are attached as well on the opposite surface 3.

Also, as shown in FIG. 4, having the adhering members 9' extend over the leading end of the wrapping segment allows them to engage adhering members 8 at a trailing end of an adjacent wrapping segment for placement on a roll or otherwise for delivery to a location of use. In this way, multiple wrapping segments can be joined for placement on a roll, and then pulled apart in operation. In some embodiments, adhering members 9 are formed of hook and loop material joined to a surface of the wrapping segment. Alternatively, adhering members 9 comprise a permanent fixed adhesive attached to the leading end of a wrapping segment, used either in combination with or as a substitute for adhering members formed of hook and loop material. Such fixed adhesive material is optionally positioned in like manner to hook and loop material for adhering members 9 as described herein, for releasable engagement with the trailing end of an adjacent wrapping segment. When an adhesive is used instead of hook and loop material for adhering members 9, it is intended that the adhesive will have a strength and/or be applied in an amount that it can releasably hold two adjacent wrapping segments together on a continuous roll of material, yet not so strong as to prevent adjacent segments from separating as part of a wrapping operation. Rather, the function is to hold the adjacent wrapping segments for the purpose of their placement on a roll, followed by their separation when the wrapping segment closest to a bale of material is about to undergo wrapping.

Figure 2:
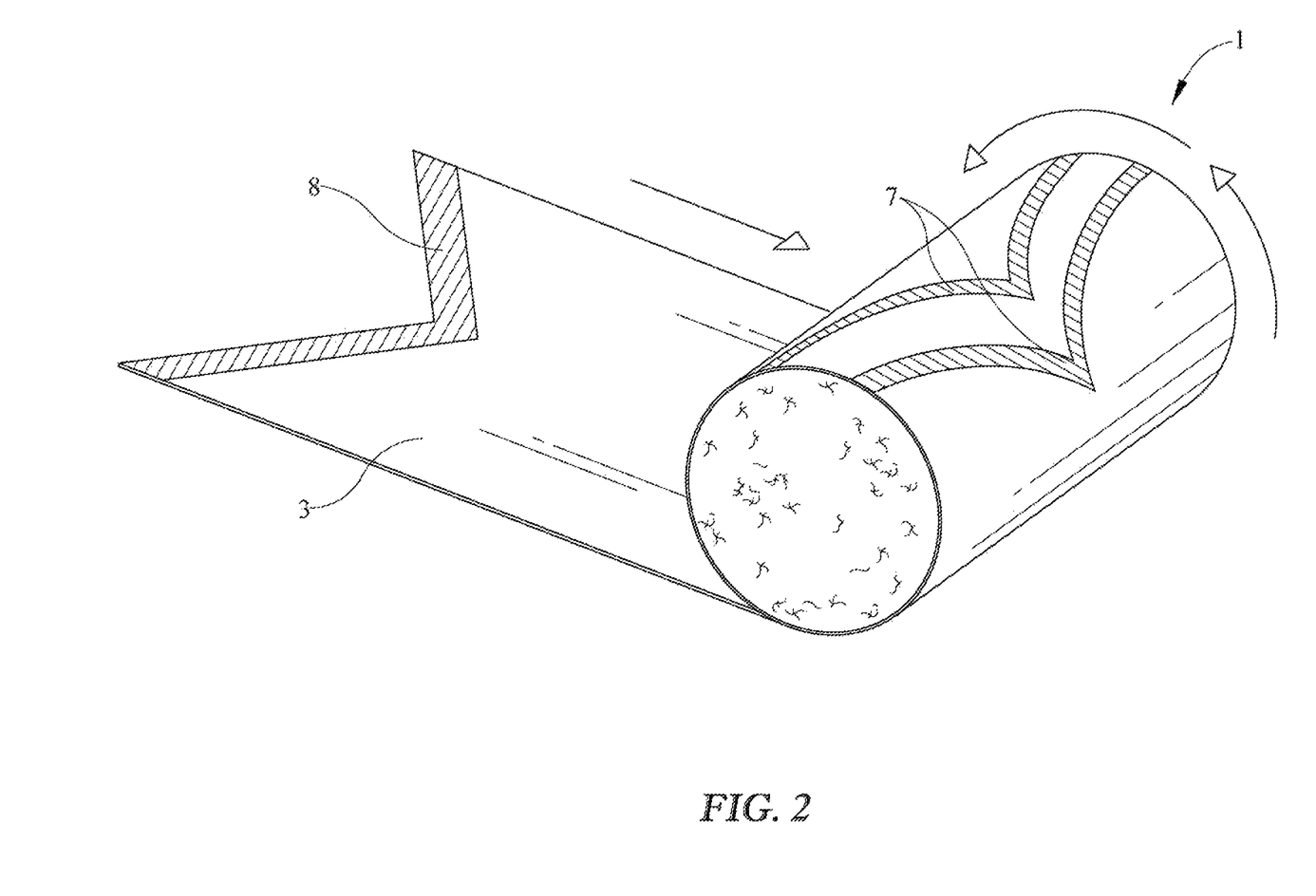
FIG. 2 is a perspective view of a wrapping segment such as shown FIGS. 1A and 1B in operation, encircling a subject bale and self-attaching its adhering members on one surface of the wrapping segment to adhering members on the opposite surface of the same wrapping segment, according to multiple embodiments and alternatives.

In operation, as shown in FIG. 2, adhering members 7 on a surface 2 (as seen in FIG. 1A) are positioned to receive adhering members 8 on the opposite surface 3. Thus, as the wrapping segment rotatably encircles the bale of material by moving in a direction indicated by arrows showing rotation in FIG. 2, adhering members 8 come into contact with adhering members 7. In FIG. 2, the bale is shown in its customary cylindrical shape, most of which is covered by the wrapping segment, but with one end circle uncovered as seen in the drawing. As known to persons of ordinary skill in the art, the nature of the hook and loop material will cause adhering members 8 and adhering members 7 to hold together, thus securing first surface 2 and second surface 3 of a single wrapping segment 1.

Once received, the hook and loop fasteners of the adhering members 7, 8 securely attach wrapping segment 1 around the bale. This is the result that is occurring as shown in FIG. 2. Although non-limiting, adhering members 8 (at the trailing end of the wrapping segment) may be present on both surfaces of the wrapping segment. In some embodiments as shown in FIG. 2, the part of the adhering members 8 that is visible is seen on the second surface 3, which is the surface that faces the bale and much of which will be in contact with the bale. In turn, adhering members 7 shown in FIG. 2 are on a surface of the wrapping segment that faces opposite the bale, and this surface is exposed to the wind, precipitation and other elements of nature. Because of rotation, a portion of adhering members 7 is obscured in FIG. 2 by the wrapping segment itself, though all three rows of adhering members 7 are visible in FIG. 1A.

Figure 3:
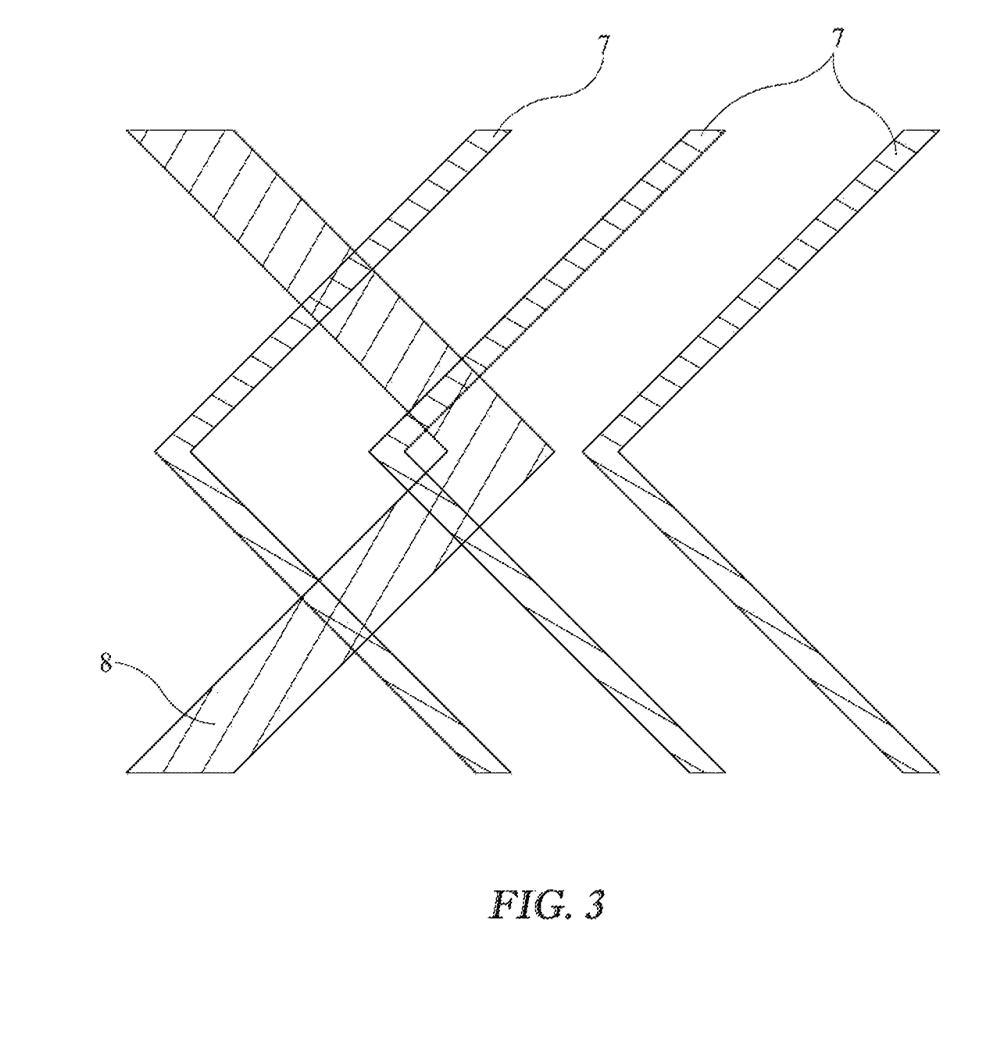
FIG. 3 provides a schematic showing how self-attaching adhering members from opposite surfaces of a wrapping segment such as shown in FIGS. 1A and 1B engage with each other as a single wrapping segment encircles a bale, according to multiple embodiments and alternatives.

FIG. 3, a schematic drawing, represents how adhering members 8 from one surface of a wrapping segment engage with adhering members 7 of an opposite surface of the same wrapping segment. The respective orientations of the adhering members (e.g., angular positioning on the substrate including the direction they are pointed) are such that as the adhering members 7, 8 make contact, the trailing end adhering members 8 and the body adhering members 7 are pointed in opposing directions. By orienting the adhering members in this way and having two or more rows of angled, pointed adhering members 7, it is not necessary for adhering members 8 to completely overlap the adhering members 7 on the opposite surface, nor is it necessary for adhering members 8 to contact every one of the adhering members 7.

As seen in FIG. 1A, in some embodiments adhering members 7 form a chevron-shaped angled line of three rows. As seen in FIGS. 1B and 2, adhering members 8 are illustrated as a single row upon one or more surfaces of the wrapping segment at its trailing end. And as seen in FIGS. 1A, 1B, and 4, adhering members 9 are illustrated as a set of four tabs positioned at a leading end of wrapping segment 1. Smaller-sized adhering members 9 might be desirable in some embodiments to allow for easier separation compared to an entire strip of adhering members at the leading edge of a wrapping segment. However, except as recited in the claims, present embodiments are not limited to adhering members 7, 8, and 9 of a particular shape, configuration, or being arranged or oriented in a particular number of pieces, rows, or angles.

Although the figures illustrate one way of configuring the adhering members 7, 8, and 9, any of them can be positioned in a number of different ways depending on the particular needs. One criteria is that the positioning of adhering members 7, 8 should make it possible for two surfaces 2, 3 of a single wrapping segment to come in contact during operation and stay in contact until pulled apart when the wrapping segment is removed from the bale, wherein their staying in contact happens through the adhering members which act as fasteners, as opposite surface come together during the process of a wrapping segment encircling a bale. Another criteria is that the positioning of adhering members 8, 9 is such that respective trailing and leading ends of two separate wrapping segments come in contact during roll formation and stay in contact until pulled apart in operation, such as by brake stopping that facilitates their separation as described in US Publication No. 2016/0280404, incorporated by reference as set forth above.

In some embodiments, the adhering members 7, 8, and 9, which above are designated by their respective locations along a wrapping segment (e.g. body adhering members, leading end adhering members, etc.), are joined to the substrate forming the wrapping material by various methods known to persons of ordinary skill in the art, such as by bonding, sewing, or welding (e.g., sonically welded or heat welded). As desired, the hook and loop material can be used for the adhering members denoted by reference numerals 7, 8, and 9 can be positioned in either an opposed direction for heightened shear performance or in a complementary direction.

It would be well understood by the ordinarily skilled artisan that such an inventive wrap is scalable to many desired sizes for different types of wrapped materials. For the baling process, sufficient wrapping material is contained on a supply reel or core (not shown) to yield a field supply roll of sufficient wrapping segments for harvesting a multiplicity of round bales. The amount of wrapping material on the supply roll is sometimes limited to the capacity of the harvesting machine in terms of the storage space and technological capabilities of said harvesting machine.

Also, it will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method of forming a reusable material for wrapping a baled agricultural product, comprising:
   configuring a wrapping segment formed from a substrate having a first surface, a second surface, and two sides to encircle the agricultural product and adhere to itself, by:
   joining a plurality of adhering members to the substrate with at least one adhering member joined to each of said first surface and second surface, and at least one adhering member on each of said first surface and second surface being angled relative to the sides of the substrate to form a point, thereby forming the wrapping segment;
   arranging the wrapping segment so one of the first surface or the second surface will face away from the baled agricultural product and the other surface will face toward the baled agricultural product when the wrapping segment encircles the baled agricultural product;
   arranging the adhering members on each surface so that when the wrapping segment encircles the baled agricultural product, the adhering members of the first surface and the adhering members of the second surface releasably contact and attach to each other with the point of the first surface adhering members directed opposite the point of the second surface adhering members.

2. The method of claim 1, where the plurality of adhering members are formed of hook and loop material.

3. The method of claim 1, wherein the agricultural product is cotton.

4. The method of claim 1, wherein the adhering members on one or both of said first surface and second surface are positioned in a plurality of angled, pointed rows.

5. The method of claim 1, further comprising releasably holding together a first wrapping segment and a second wrapping segment formed according to claim 1 and placing them on a roll by winding the wrapping segments about a core.

6. The method of claim 5, wherein each of first wrapping segment and second wrapping segment comprises a leading end and a trailing end, and wherein releasably holding together the two wrapping segments comprises releasably attaching at least one trailing end adhering member formed of hook and loop material and positioned at the trailing end of the first wrapping segment to at least one leading end adhering member formed of hook and loop material and positioned at the leading end of the second wrapping segment.

7. The method of claim 6, wherein the leading end of the wrapping segments has a chevron shape that is convex and the trailing end of the wrapping segments has a concave shape which is the inverse of the point of the leading end.

8. The method of claim 6, wherein the at least one leading end adhering member is arranged on the wrapping segment as a tab comprising hook and loop material adhered to both the first surface and the second surface of the wrapping segment.

9. The method of claim 6, wherein releasably holding together the two wrapping segments comprises releasably attaching at least one trailing end adhering member positioned at the trailing end of the first wrapping segment to at least one leading end adhering member positioned at the leading end of the second wrapping segment, wherein the leading end adhering members is formed of an adhesive fixed to the wrapping segment.

\* \* \* \* \*